US010845818B2

(12) United States Patent
Kehl

(10) Patent No.: US 10,845,818 B2
(45) Date of Patent: Nov. 24, 2020

(54) SYSTEM AND METHOD FOR 3D SCENE RECONSTRUCTION OF AGENT OPERATION SEQUENCES USING LOW-LEVEL/HIGH-LEVEL REASONING AND PARAMETRIC MODELS

(71) Applicant: TOYOTA RESEARCH INSTITUTE, INC., Los Altos, CA (US)

(72) Inventor: Wadim Kehl, San Francisco, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 196 days.

(21) Appl. No.: 16/049,129

(22) Filed: Jul. 30, 2018

(65) Prior Publication Data
US 2020/0033880 A1 Jan. 30, 2020

(51) Int. Cl.
| G05D 1/02 | (2020.01) |
| G01S 17/89 | (2020.01) |
| B60W 30/09 | (2012.01) |
| G06K 9/00 | (2006.01) |
| B60W 30/095 | (2012.01) |

(Continued)

(52) U.S. Cl.
CPC ........... G05D 1/0251 (2013.01); B60W 30/09 (2013.01); B60W 30/095 (2013.01); G01S 17/89 (2013.01);
(Continued)

(58) Field of Classification Search
CPC ............... B60W 30/09; B60W 30/095; G06K 9/00798; G06K 9/00657; G06K 9/3241;
(Continued)

(56) References Cited

U.S. PATENT DOCUMENTS 9,110,163 B2* 8/2015 Rogan .................. G01S 7/4808
9,199,641 B2* 12/2015 Ferguson .............. G01S 7/4808
(Continued)

OTHER PUBLICATIONS

"Joint Object Pose Estimation and Shape Reconstruction in Urban Street Scenes Using 3D Shape Priors," Engelmann, et al., 2016 German Conference on Pattern Recognition (GCPR), 2016.
(Continued)

*Primary Examiner* — Dale W Hilgendorf
*Assistant Examiner* — Alexander C. Bost
(74) *Attorney, Agent, or Firm* — Seyfarth Shaw LLP

(57) ABSTRACT

A method for a 3D scene reconstruction of autonomous agent operation sequences includes iteratively parsing sequence segmentation parts of agent operation sequence images into dynamic sequence segmentation parts and static sequence segmentation parts. The method also includes fitting 3D points over the static sequence segmentation parts to construct a 3D model of the static sequence segmentation parts over multiple frames of the agent operation sequence images. The method further includes removing the 3D model of the static sequence segmentation parts from the agent operation sequence images. The method also includes processing the dynamic sequence segmentation parts from each of the agent operation sequence images over the multiple frames of the agent operation sequence images to determine trajectories of the dynamic sequence segmentation parts. The method further includes reconstructing the agent operation sequences in a 3D moving simulation including the dynamic sequence segmentation parts and the static sequence segmentation parts.

18 Claims, 9 Drawing Sheets

(51) Int. Cl.
  *G06K 9/32* (2006.01)
  *G06T 7/10* (2017.01)
  *G06T 19/20* (2011.01)
  *G06N 5/04* (2006.01)

(52) U.S. Cl.
  CPC ..... *G06K 9/00657* (2013.01); *G06K 9/00798* (2013.01); *G06K 9/3241* (2013.01); *G06N 5/04* (2013.01); *G06T 7/10* (2017.01); *G06T 19/20* (2013.01); *G05D 2201/0213* (2013.01); *G06T 2207/20081* (2013.01); *G06T 2207/30241* (2013.01); *G06T 2207/30256* (2013.01)

(58) Field of Classification Search
  CPC . G06T 7/10; G06T 19/20; G06T 2207/30241; G06T 2207/20081; G06T 2207/30256; G06T 2207/20084; G06T 2207/30261; G06T 2207/10024; G06T 2207/10028; G06T 2207/10016; G06T 7/73; G06T 7/215; G01S 17/89; G06N 5/04; G05D 1/0251; G05D 2201/0213
  See application file for complete search history.

(56) References Cited

U.S. PATENT DOCUMENTS

| | | | |
|---|---|---|---|
| 9,488,492 B2 | 11/2016 | Samarasekera et al. | |
| 9,576,185 B1* | 2/2017 | Delp | G06K 9/00201 |
| 9,623,905 B2 | 4/2017 | Shashua et al. | |
| 2014/0214255 A1* | 7/2014 | Dolgov | G05D 1/0248 |
| | | | 701/23 |
| 2015/0086078 A1* | 3/2015 | Sibiryakov | G06T 3/4038 |
| | | | 382/104 |
| 2015/0269438 A1* | 9/2015 | Samarasekera | G06K 9/00637 |
| | | | 382/154 |
| 2016/0163198 A1* | 6/2016 | Dougherty | G08G 1/162 |
| | | | 340/905 |
| 2017/0154425 A1* | 6/2017 | Pierce | G06K 9/4671 |
| 2017/0213149 A1* | 7/2017 | Micks | G06N 20/00 |
| 2018/0349526 A1* | 12/2018 | Atsmon | G06F 30/20 |
| 2018/0365888 A1* | 12/2018 | Satzoda | G06T 7/70 |
| 2019/0130056 A1* | 5/2019 | Tascione | G06F 30/20 |
| 2019/0179979 A1* | 6/2019 | Melick | G01S 17/931 |
| 2019/0228571 A1* | 7/2019 | Atsmon | G01C 11/04 |
| 2020/0033866 A1* | 1/2020 | Song | G05D 1/0221 |

OTHER PUBLICATIONS

"SAMP: Shape and Motion Priors for 4D Vehicle Reconstruction," Engelmann, et al., 2017 Winter Conference on Applications of Computer Vision (WACV), Mar. 2017.

"3D-RCNN: Instance-level 3D Object Reconstruction via Render-and-Compare," Kundu, et al., Conference on Computer Vision and Pattern Recognition (CVPR), 2018.

* cited by examiner

SYSTEM AND METHOD FOR 3D SCENE RECONSTRUCTION OF AGENT OPERATION SEQUENCES USING LOW-LEVEL/HIGH-LEVEL REASONING AND PARAMETRIC MODELS

BACKGROUND

Field

Certain aspects of the present disclosure generally relate to machine learning and, more particularly, to a system and method for 3D scene reconstruction and/or annotation of agent operation sequences using low-level/high-level reasoning and parametric models.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing due to the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained convolutional neural network (CNN) to identify objects within areas of interest in an image of a surrounding scene of the autonomous agent. For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous vehicle. Object detection applications for autonomous vehicles may analyze sensor image data for detecting objects in the surrounding scene from the autonomous agent.

Autonomous agents, such as driverless cars and robots, are quickly evolving and becoming a reality in this decade. Unfortunately, because autonomous agents have to interact with humans, many critical concerns arise. For example, how can we ensure that an autonomous agent or system is safe? To this end, outstanding testing procedures are desired. Unfortunately, testing autonomous agents may involve creating stress situations to assess the behavior of agents in corner cases or atypical situations.

SUMMARY

A method for a 3D scene reconstruction of autonomous agent operation sequences includes iteratively parsing sequence segmentation parts of agent operation sequence images into dynamic sequence segmentation parts and static sequence segmentation parts. The method also includes fitting 3D points over the static sequence segmentation parts to construct a 3D model of the static sequence segmentation parts over multiple frames of the agent operation sequence images. The method further includes removing the 3D model of the static sequence segmentation parts from the agent operation sequence images. The method also includes processing the dynamic sequence segmentation parts from each of the agent operation sequence images over the multiple frames of the agent operation sequence images to determine trajectories of the dynamic sequence segmentation parts. The method further includes reconstructing the agent operation sequences in a 3D moving simulation including the dynamic sequence segmentation parts and the static sequence segmentation parts.

A non-transitory computer-readable medium having program code recorded thereon for a 3D scene reconstruction of autonomous agent operation sequences is described. The program code, which is executed by a processor, includes program code to iteratively parse sequence segmentation parts of agent operation sequence images into dynamic sequence segmentation parts and static sequence segmentation parts. The non-transitory computer-readable medium also includes program code to fit 3D points over the static sequence segmentation parts to construct a 3D model of the static sequence segmentation parts over multiple frames of the agent operation sequence images. The non-transitory computer-readable medium further includes program code to remove the 3D model of the static sequence segmentation parts from the agent operation sequence images. The non-transitory computer-readable medium also includes program code process the dynamic sequence segmentation parts from each of the agent operation sequence images over the multiple frames of the agent operation sequence images to determine trajectories of the dynamic sequence segmentation parts. The non-transitory computer-readable medium further includes program code to reconstruct the agent operation sequences in a 3D moving simulation including the dynamic sequence segmentation parts and the static sequence segmentation parts.

An autonomous vehicle system for a 3D scene reconstruction of autonomous agent operation sequences is described. The autonomous agent vehicle system includes a neural network configured to alter a 3D moving simulation of agent operation sequence images to spoof sensors of an autonomous agent. The autonomous agent vehicle system also includes a controller configured to control a behavior of a vehicle based on improvements to a planner and/or the controller of the autonomous agent in response to altering the 3D moving simulation.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed

DETAILED DESCRIPTION

Figure 1:
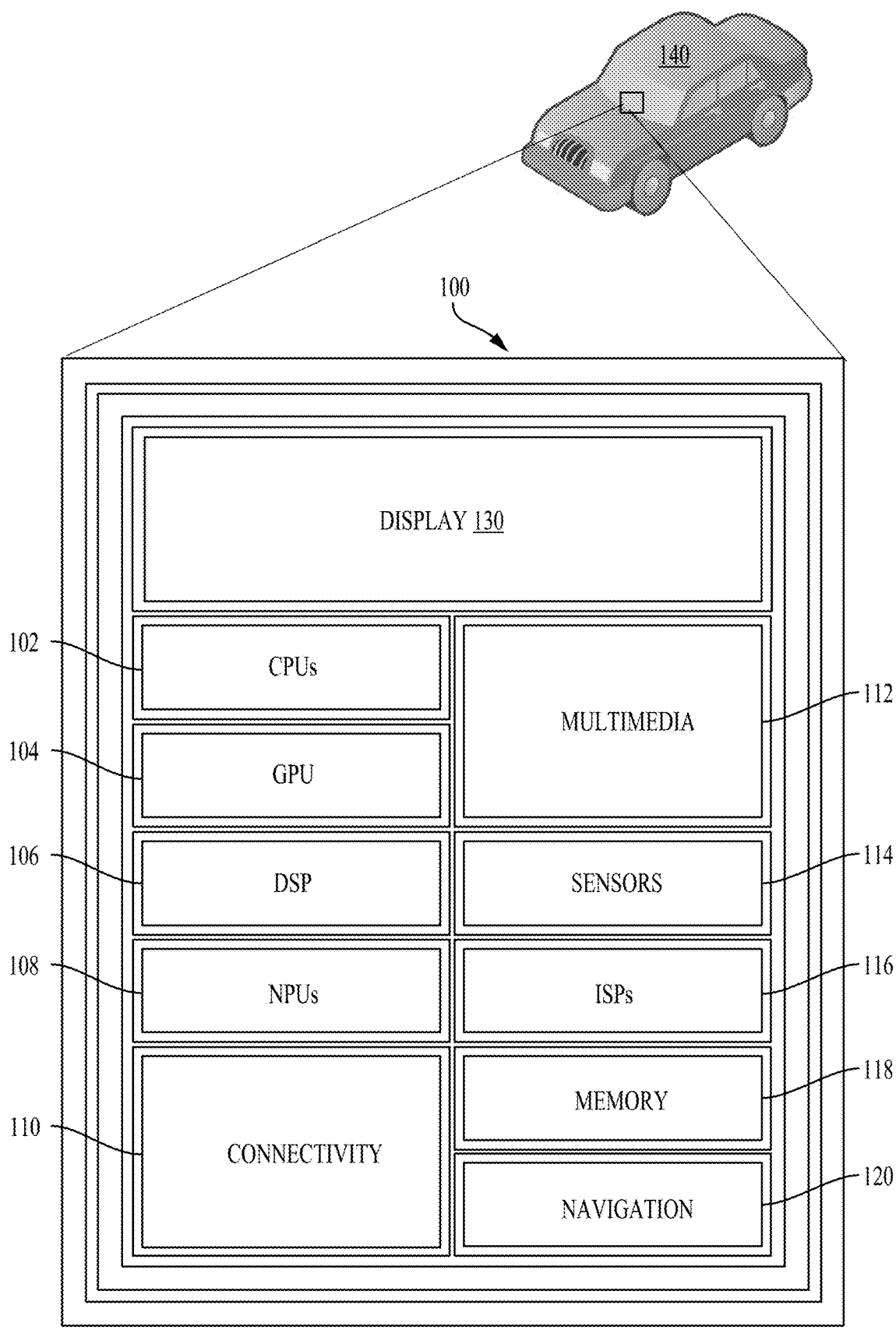
FIG. 1 illustrates an example implementation of designing a neural network using a system-on-a-chip (SOC) of a vehicle vision system of an autonomous agent, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

Aspects of the present disclosure are directed to a system and method for 3D scene recreation and/or annotation of autonomous agent operation sequences using low-level/high-level reasoning and parametric models. Aspects of the present disclosure, jointly leverage low-level cues from sensors and high-level cues from machine learning models to three-dimensionally reconstruct the road and actors during an agent operation sequence using a global framework. Conventional simulation systems may solve the problem of scene re-creation/estimation by inferring vehicle instances and their 3D shapes in a given scene by using a parametric representation of the vehicles. One conventional solution also incorporates time and motion in the estimation.

Autonomous agents, such as driverless cars and robots, are evolving quickly and becoming a reality this decade. Operation of autonomous vehicles and semi-autonomous vehicles may be controlled or adjusted based on predicted actions (e.g., behaviors) of surrounding agents, such as vehicles and pedestrians. For example, a route may be planned for an autonomous vehicle based on the predicted actions of surrounding agents. In addition, a route may be adjusted to avoid a collision based on the predicted actions of surrounding agents. In the present disclosure, unless otherwise noted, a vehicle refers to an autonomous agent or a semi-autonomous agent.

Conventional vehicles are controlled based on predicted trajectories of surrounding agents. The trajectories of surrounding agents may be predicted using Markov chains, or other probabilistic approaches, to provide a low-level prediction of movements. The trajectories predict where an agent may travel from a current time to a future time. These predicted trajectories may be used to adjust a route of the autonomous agent to avoid a collision based on the predicted actions of surrounding agents. Unfortunately, testing these collision avoidance features of an autonomous agent may be difficult in real-world situations. In particular, because autonomous agents interact with humans, concerns may arise. One specific concern is safety.

Simulation enables creating stress situations to test the behavior of the autonomous agent during corner cases or atypical situations. Given the risk of testing collision avoidance using human lives, such tests may be performed in simulation environments. Simulation environments enable testing of corner cases and extreme situations in a safe way (e.g., without putting human lives in danger). Furthermore, a verification process for the autonomous agents may be executed in parallel by running copies of a simulator in multiple distributed nodes. Unfortunately, designing simulators that allow for inferring vehicle instances and their 3D shapes in a given scene remains a challenge.

According to aspects of the present disclosure, an approach is described for inferring vehicle instances and their 3D shapes in a given scene by building a thorough framework. For example, 3D scene reconstruction of agent operation sequences is performed by reasoning about scene geometry (road, sidewalk, traffic light posts) and spatial relationships between all traffic participants. In addition, physical constraints are also incorporated, such as 'cars must be on the road and pedestrians on the side walk', 'vehicles cannot spatially intersect each other' or 'cars must physically obey a smooth speed transition between frames.' The reasoning enables decomposition of an image into static and dynamic elements.

Unfortunately, designing autonomous agent simulators that support 3D scene reconstruction and/or annotation of operation sequences remains a challenge. To solve this challenge, aspects of the present disclosure involve simulators for improving autonomous vehicle operation. This includes transferring recorded on-board operation sequences, known as transaction logs or TLOGs, into a simulator. In particular, sensor readings, such as cameras (e.g., red-green-blue (RGB) cameras, RGB-depth (RGB-D) cameras), light detection and ranging (LIDAR) sensors, sonar sensors, radar, global positioning system (GPS), and inertial measurement unit (IMU) readings recorded during operation of an autonomous agent are used for recreating the same sequence in simulation. This enables: 1) analysis of the behavior of all traffic participants, which can be varied to "spoof" the autonomous agent sensors for reaction testing; 2) building of better maps; and/or 3) creating labels for machine learning methods. One exemplary process may be performed as follows.

Reconstructing an operation sequence of an autonomous vehicle in a three dimension (3D) simulation begins by performing object detection of images captured by the cameras of the autonomous vehicle during the operation sequence. This object detection is a first step that is followed by decomposition of scenes in the operation sequence into vegetation, streets, sidewalks, curbs, etc., which represent static elements or the static elements of the world. As described herein, static elements refer to elements/objects that are fixed along a route encountered during the operation sequence. The decomposition process also identifies actors (e.g., vehicles, pedestrians) encountered by the autonomous agent during the operation sequence, which represent dynamic elements. This two-step process provides a semantic segmentation of the operation sequences into an operating sequence segmentation of static and dynamic elements, which is repeated over various frames to simulate the motion of the autonomous vehicle during the operation sequence.

In aspects of the present disclosure, the two-step process provides a sequence segmentation of the operation sequence. The sequence segmentation may be iteratively parsed to decompose the sequence segmentation into the noted static and dynamic objects. The decomposition of the sequence segmentation is used to form a 3D scene reconstruction using both low-level and high-level reasoning cues. For example, a 3D scene reconstruction of agent operation sequences is performed by reasoning about scene geometry (road, sidewalk, traffic light posts) and spatial relationships between all traffic participants. In addition, physical constraints are also incorporated, such as 'cars must be on the road and pedestrians on the side walk', 'vehicles cannot spatially intersect each other' or 'cars must physically obey a smooth speed transition between frames.' The reasoning enables decomposition of an image into static and dynamic elements.

For example, the road and sidewalks are extracted as 3D models by using the semantic segmentation of the frames captured by the cameras of the autonomous vehicle to identify LIDAR points that belong to those surfaces. Extracting of the road and sidewalks is followed by triangulation. This process involves application of strong physical priors about the position and motion of vehicles and pedestrians over various frames of the agent operation sequence. Next, object detection methods are used to identify instances and segmentations of traffic participants (vehicles, pedestrians, bikes, animals, etc.) and scene geometry (traffic lights, traffic signs, etc.).

By means of parametric shape models, geometric fitting is conducted over multiple sensor modalities that best explain the observations and measure the error with projection metrics. Additional inter-frame constraints (e.g, IMU and GPS readings) are used for robustly estimating an entire sequence (including motion) over the various recorded frames. This process combines low-level cues (e.g., LIDAR points) with high-level machine learning cues (e.g., segmentation, object detection), and physical priors together with parametric models and projection error means into a global optimization problem. This aspect of the present disclosure combines low-level cues with high-level machine learning cues and physical priors together with parametric models and projection error means to guide the 3D reconstruction process.

A system and method for inferring vehicle instances and their 3D shapes in a given scene, according to aspects of the present disclosure, relies on an artificial (e.g., convolutional) neural network to learn segmentation and object detection in a given autonomous agent operation scene (e.g., a frame). An artificial neural network, which may be composed of an interconnected group of artificial neurons (e.g., neuron models), is a computational device or represents a method to be performed by a computational device. For example, convolutional neural networks are a type of feed-forward artificial neural network used in the area of object detection and classification. In particular, convolutional neural networks (CNNs) may be trained to recognize various viewpoints of a detected object in a region of interest of an image, and thus, have been used in object recognition and other classification applications. Other models are also available for object recognition and classification. For example, support vector machines (SVMs) are learning algorithms that can be applied for classification.

Aspects of the present disclosure are related to a machine learning system and method for 3D scene annotation of agent operation sequences using low-level/high-level reasoning and parametric models. During operation of an autonomous vehicle, the autonomous vehicle captures various data while traveling along a route. The collected data may include, but is not limited to, recorded on-board operation sequences (e.g., transaction logs or TLOGs), sensor readings, such as cameras (e.g., red-green-blue (RGB) cameras, RGB-depth (RGB-D) cameras), light detection and ranging (LIDAR) sensors, sonar sensors, radar, global positioning system (GPS), and recorded inertial measurement unit (IMU) readings. In aspects of the present disclosure, the collected data during operation of the autonomous agent provides low-level cues that are combined with high-level cues from machine learning modes for a 3D reconstruction of a scene including scenery, actors, and a road. One aspect of the present disclosure is directed to a novel system and method for variation of a 3D simulation of an operation sequence to test and improve operation of an autonomous vehicle.

FIG. 1 illustrates an example implementation of the aforementioned system and method for 3D reconstructing of autonomous operation in simulation using a system-on-a- chip (SOC) 100 of a vehicle vision system for an autonomous vehicle 140. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 140. In this arrangement, the autonomous vehicle 140 may include a processor and other features of the SOC 100. In this aspect of the present disclosure, instructions loaded into a processor (e.g., CPU 102) or the NPU 108 of the autonomous vehicle 140 may include code for detecting one or more objects in a region of interest in an image captured by the sensor processor 114. The instructions loaded into a processor (e.g., CPU 102) may also include code for planning and control in response to one or more objects detected in the region of interest in the image captured by the sensor processor 114.

Figure 2:
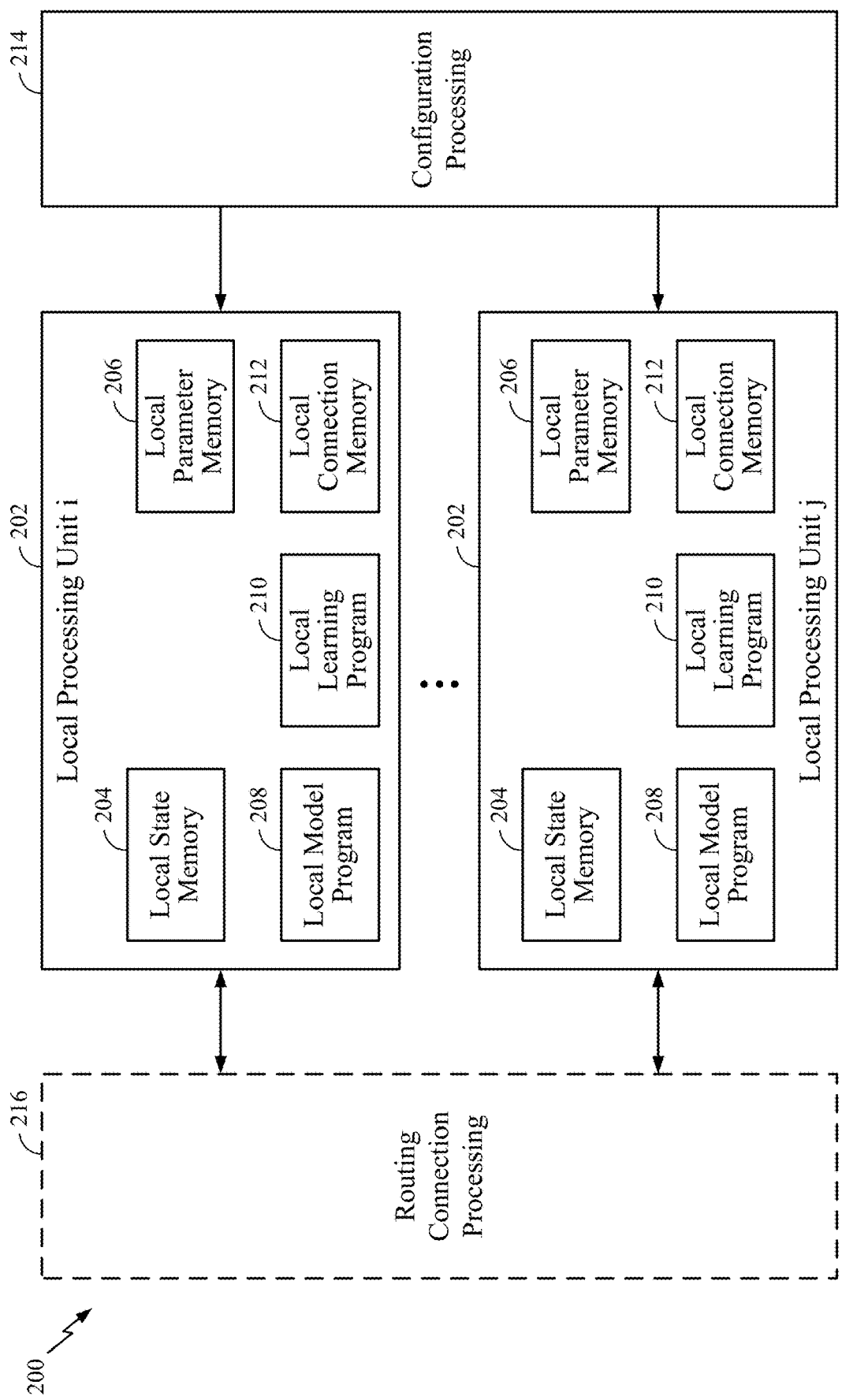
FIG. 2 illustrates an example implementation of a system, in accordance with aspects of the present disclosure.

FIG. 2 illustrates an example implementation of a system 200 in accordance with certain aspects of the present disclosure. As illustrated in FIG. 2, the system 200 may have local processing units 202 that may perform various operations of methods described herein. Each of the local processing units 202 may comprise a local state memory 204 and a local parameter memory 206 that may store parameters of a neural network. In addition, each of the local processing units 202 may have a local (neuron) model program (LMP) memory 208 for storing a local model program, a local learning program (LLP) memory 210 for storing a local learning program, and a local connection memory 212. Furthermore, as illustrated in FIG. 2, each of the local processing units 202 may interface with a configuration processing unit 214 for providing configurations for local memories of the local processing unit, and with a routing connection processing unit 216 that provides routing between the local processing units 202.

Deep learning architectures may perform a pattern recognition task by learning to represent inputs at successively higher levels of abstraction in each layer, thereby building up a useful feature representation of the input data. In this way, deep learning may address a major bottleneck of traditional machine learning. Prior to the advent of deep learning, a machine learning approach to a pattern recognition problem may have relied heavily on human engineered features in combination with a shallow classifier. A shallow classifier may be a two-class linear classifier, for example, in which a weighted sum of the feature vector components may be compared with a threshold to predict a classification for the input. Human engineered features may be templates or kernels tailored to a specific problem domain by engineers with domain expertise. Deep learning architectures, in contrast, may learn to represent patterns through training. Furthermore, a deep learning network may learn to represent and recognize new types of patterns that a human may not have considered.

A convolutional neural network (CNN) may be trained with supervised learning. During training, a CNN may be presented with various viewpoints of various object categories. The network designer may want the CNN to output an estimate of an unknown object and corresponding pose with a high degree of confidence. Before training, the output produced by the CNN is likely to be incorrect, and so an error may be calculated between the actual output and the target output. The weights of the CNN may then be adjusted so that the output scores of the CNN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the CNN may provide high-level cues for reconstructing, in 3D, both the road and actors in an agent operation scene using a global framework. A forward pass through the network may yield an output that may be considered an inference or a prediction of the CNN for 3D agent operation scene reconstruction. The high-level cues provided by the CNN are combined with low-level cues taken from a sensor signal of one or more sensors (e.g., light detection and ranging (LIDAR) sensors, sonar sensors, red-green-blue (RGB) cameras, RGB-depth (RGB-D) cameras, and the like) of the autonomous agent.

Figure 3:
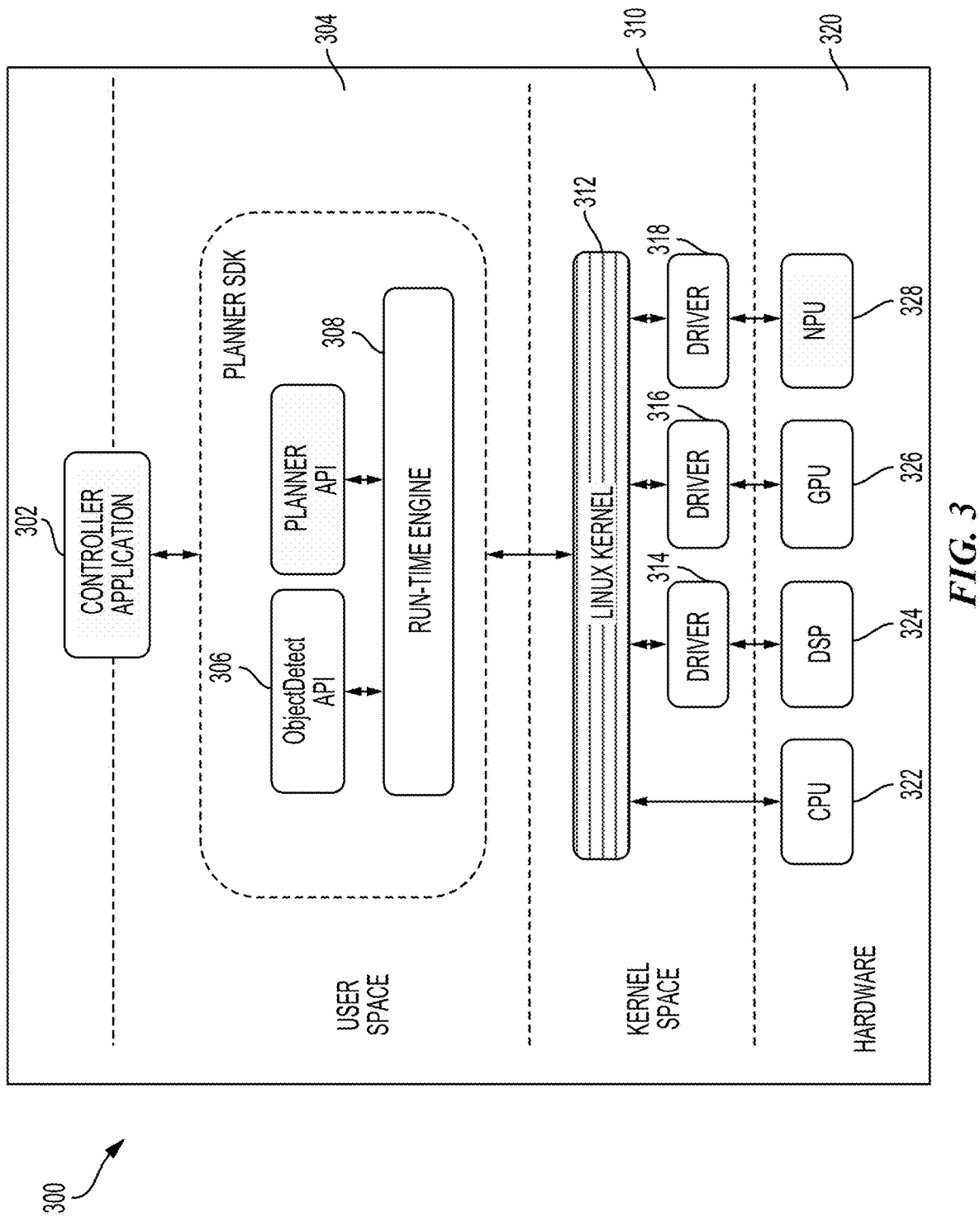
FIG. 3 is a block diagram illustrating an exemplary software architecture that may modularize artificial intelligence (AI) functions for 3D scene automation of an autonomous agent vision system, according to aspects of the present disclosure.

FIG. 3 is a block diagram illustrating an exemplary software architecture 300 that may modularize artificial intelligence (AI) functions for planning and control of an autonomous agent in response to detected objects in a surrounding region of the agent, according to aspects of the present disclosure. Using the architecture, a controller application 302 may be designed such that it may cause various processing blocks of an SOC 320 (for example a CPU 322, a DSP 324, a GPU 326 and/or an NPU 328) to perform supporting computations during run-time operation of the controller application 302.

The controller application 302 may be configured to call functions defined in a user space 304 that may, for example, provide for detecting objects in the surrounding region of the autonomous agent. The controller application 302 may make a request to compiled program code associated with a library defined in an ObjectDetect application programming interface (API) 306 to provide an estimate of an object category and corresponding pose of a previously known object. This request may ultimately rely on the output of a convolutional neural network configured to identify objects in a surrounding region of the autonomous agent.

A run-time engine 308, which may be compiled code of a runtime framework, may be further accessible to the controller application 302. The controller application 302 may cause the run-time engine 308, for example, to take actions for controlling the autonomous agent. When a detected object is within a predetermined distance of the autonomous agent, the run-time engine 308 may in turn send a signal to an operating system 310, such as a Linux Kernel 312, running on the SOC 320. The operating system 310, in turn, may cause a computation to be performed on the CPU 322, the DSP 324, the GPU 326, the NPU 328, or some combination thereof. The CPU 322 may be accessed directly by the operating system 310, and other processing blocks may be accessed through a driver, such as drivers 314-318 for the DSP 324, for the GPU 326, or for the NPU 328. In the illustrated example, the deep neural network may be configured to run on a combination of processing blocks, such as the CPU 322 and the GPU 326, or may be run on the NPU 328, if present.

Aspects of the present disclosure are directed to a system and method for 3D scene annotation of autonomous vehicle operation sequences using low-level/high-level reasoning and parametric models. One aspect of the present disclosure jointly leverages low-level cues from recorded agent operation data (e.g., sensor data, TLOGs, LIDAR, GPS, IMU, etc.) and high-level cues from machine learning models to three-dimensionally reconstruct the road and actors in the agent operation scene using a global framework. Simulating the 3D reconstruction of the agent operation sequences enables annotating of autonomous agent operation by testing the autonomous agent under additional operating conditions, for example, as shown in FIGS. 4A and 4B.

Figure 4A:
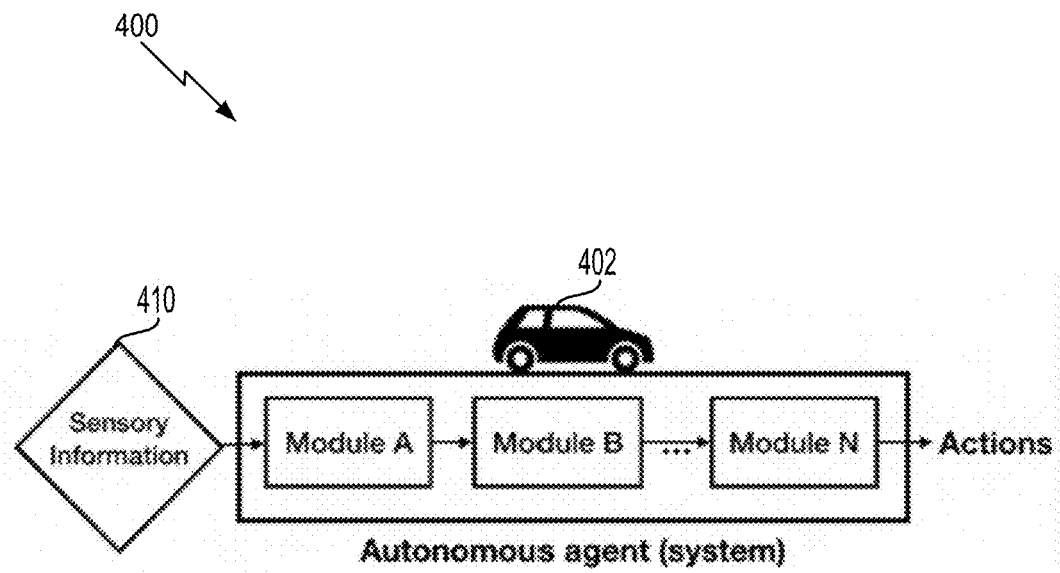
FIGS. 4A and 4B are block diagrams of autonomous agent systems, according to aspects of the present disclosure.
Figure 4B:
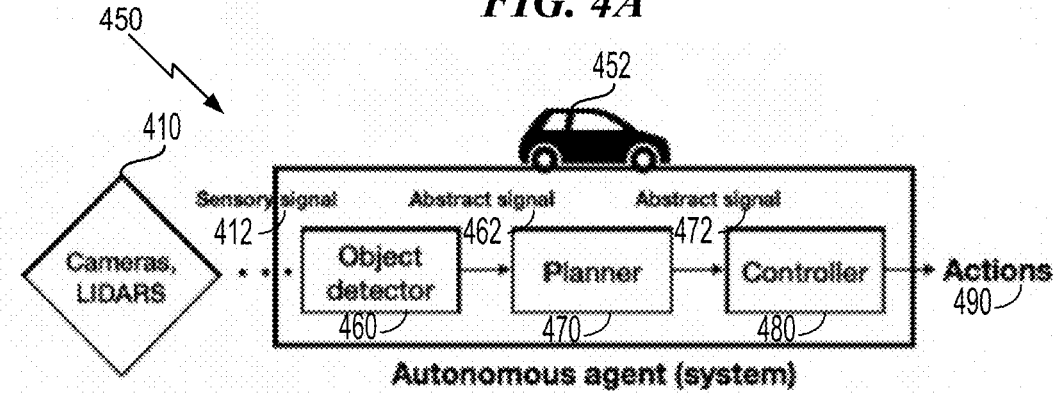

FIGS. 4A and 4B are block diagrams of autonomous agent systems, according to aspects of the present disclosure. FIG. 4A illustrates an autonomous agent system 400 for an autonomous vehicle 402. In this example, the autonomous agent system 400 is formed by multiple modules (e.g., Module A, Module B, Module N) responsible for performing different tasks for controlling the autonomous vehicle in response to sensory information 410.

FIG. 4B illustrates an autonomous agent system 450 for an autonomous vehicle 452. In this configuration, the autonomous agent system 450 also includes various modules for performing tasks in response to sensory information 410. The sensory information 410 may include, but is not limited to, information captured by one or more sensors, such as light detection and ranging (LIDAR) sensors, sonar sensors, red-green-blue (RGB) cameras, RGB-depth (RGB-D) cameras, and the like. A sensory signal 412 may provide this information to the autonomous agent system 450.

In this example, the autonomous agent system 450 is configured to perform tasks such as perception, localization, planning, and control in response to the sensory signal 412.

In this configuration, the autonomous agent system 450 includes an object detector module 460 configured to receive the sensory signal 412 and outputs a first abstract signal 462 representation of one or more detected objects. In response, a planner module 470 may determine a route of the autonomous vehicle 452 in response to the one or more detected objects and output a second abstract signal 472 to a controller module 480. The controller module 480 may be configured to control operation of the autonomous vehicle 452 in response to the second abstract signal 472 to perform various actions 490.

Figure 5:
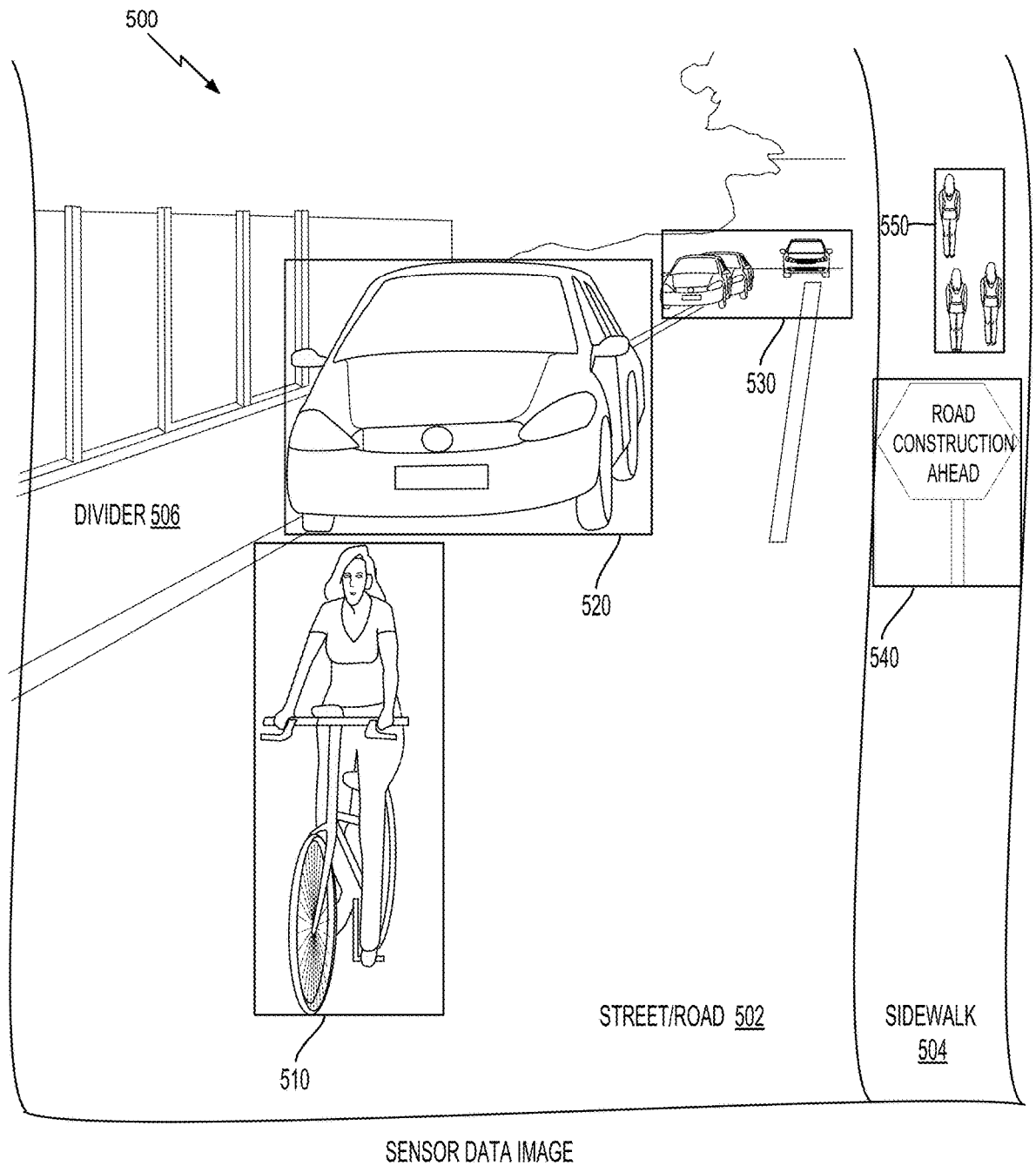
FIG. 5 illustrates a sensor data image captured by a vehicle, according to aspects of the present disclosure.

A detection framework of the autonomous agent system 450 may include multiple sensors for analyzing a 3D area surrounding the autonomous vehicle 452 as a sensor data image, for example, as shown in FIG. 5. Images captured by the sensor may be provided as red-green-blue (RGB) data (or RGB and depth (RGB-D) data). In this configuration, the object detector module 460 is configured to identify a region of interest in an image of the 3D area surrounding the autonomous vehicle 452. The object detector module 460 is configured to detect objects within the region of interest. This detected region of interest and corresponding detected objects are provided to the planner module 470 through the first abstract signal 462.

FIG. 5 illustrates a sensor data image captured by an autonomous vehicle, according to aspects of the present disclosure. In this example, a sensor data image 500 includes various regions of interest within a scene illustrating, for example, an environment including on-coming traffic sensed by a vehicle. Representatively, a first region of interest 510 may include a bicycle rider. A second region of interest 520 includes a vehicle following the bicycle rider in the first region of interest 510. A third region of interest 530 includes further on-coming vehicles. The sensor data image 500 further includes a fourth region of interest 540 including a road construction sign and a fifth region of interest 550 including road workers.

Unfortunately, reconstructing a 3D representation recorded by vehicle sensors during operation of an autonomous agent in real-world situations, for example, as shown in the sensor data image 500 of FIG. 5, may be problematic. In particular, during operation, an autonomous agent possibly interacts with the bicycle rider in the first region of interest or the road workers in the fifth region of interest 550. A collision avoidance failure of the autonomous agent could potentially lead to harm of these actors. The reconstructed 3D representation of the sensor data image 500 may enable spoofing of sensors to test operation of the autonomous agent if the trajectory of one of the actors suddenly changed.

Annotation of the reconstructed 3D representation of the sensor data image 500 may enable placing of 3D bounding boxes on dynamic elements (e.g., traffic participants) of the operation sequence images. This annotation distinguishes traffic participants (e.g., vehicles, pedestrians, bikes, animals, etc.) from scene geometry (e.g., traffic lights, traffic signs, roads, sidewalks, curves, etc.). A process for 3D reconstruction of operation sequence images captured during agent operation is shown in FIG. 6.

Figure 6:
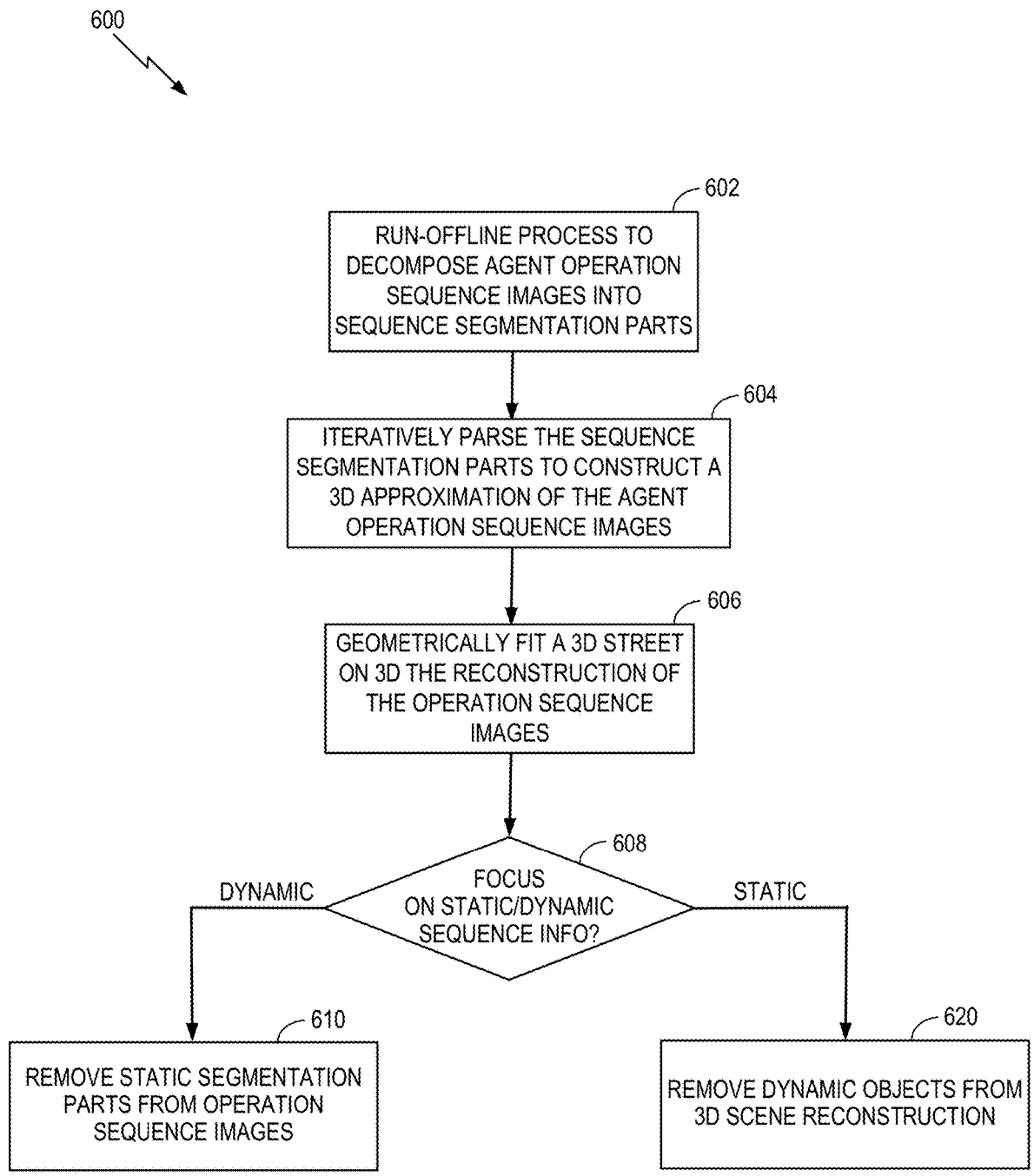
FIG. 6 is a flowchart illustrating a process for 3D scene reconstruction and/or annotation of agent operation sequences using low-level/high-level reasoning and parametric models, according to aspects of the present disclosure.

FIG. 6 is a flowchart illustrating a method for 3D scene reconstruction and/or annotation of agent operation sequences using low-level/high-level reasoning and parametric models, according to aspects of the present disclosure. A method 600 begins at block 602, in which an off-line process is run to decompose agent operation sequence images into sequence segmentation parts. For example, as shown in FIG. 5, sensor data image 500 captured during operation of an autonomous agent (e.g., 140) is decomposed into traffic participants (e.g., the bicycle rider in the first region of interest 510) and scene geometry (e.g., the street/road 502).

At block 604, the scene segmentation parts are iteratively parsed to construct a 3D approximation of the operation sequence images. At block 606, a 3D street is geometrically fit on the 3D reconstruction of the operation sequence images. At block 608, it is determined whether the method is focusing on static or dynamic sequence segmentation parts. At block 610, the method is focused on the dynamic segmentation parts, such that static segmentation parts are removed from the operation sequence images. Otherwise, at block 620, the method is focused on the static segmentation parts, such that dynamic segmentation parts are removed from the operation sequence images.

Figure 7:
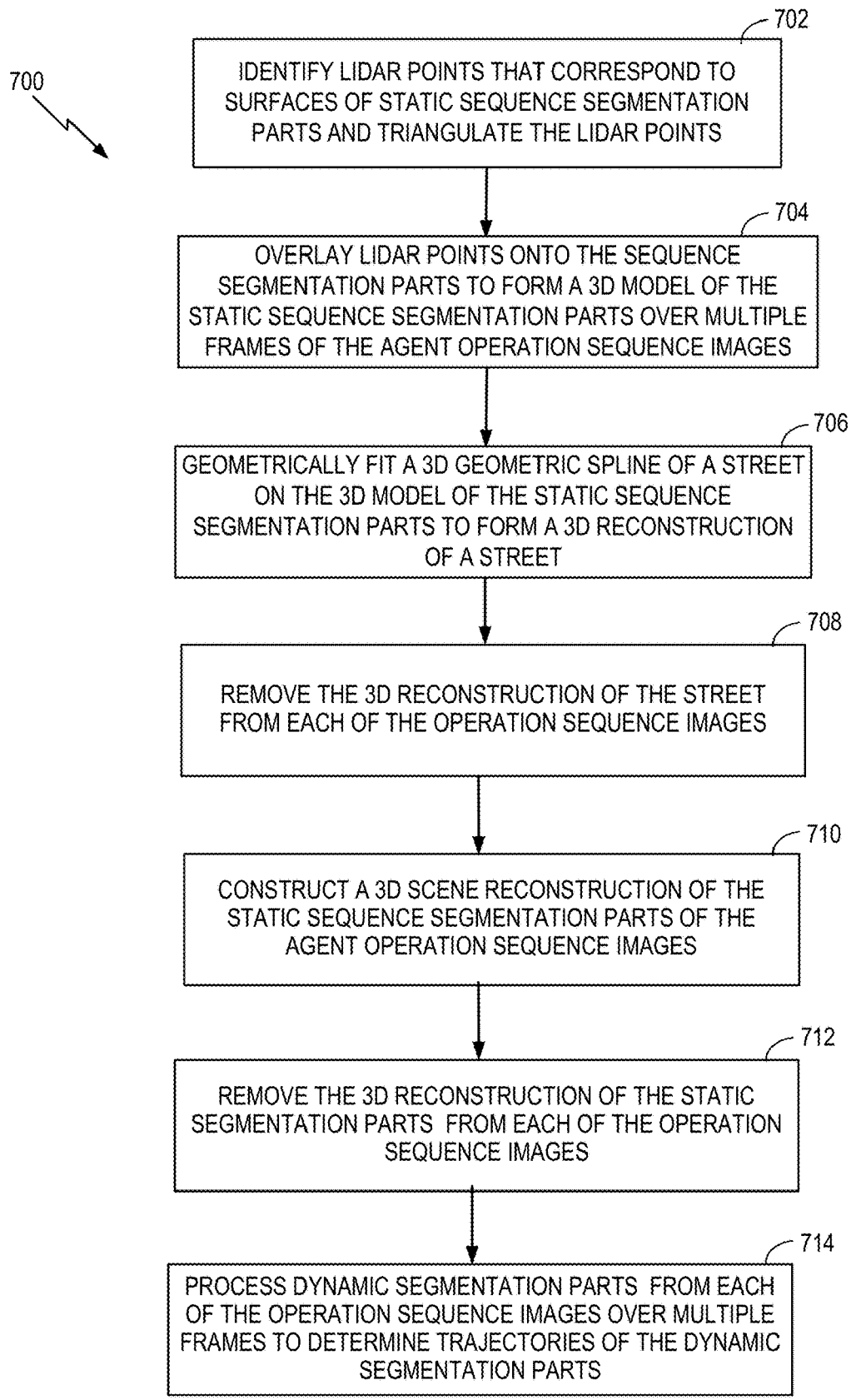
FIG. 7 is a flowchart illustrating a method for 3D scene reconstruction and/or annotation of agent operation sequences using low-level/high-level reasoning and parametric models, according to aspects of the present disclosure.

FIG. 7 is a flowchart illustrating a method for 3D scene reconstruction and/or annotation of agent operation sequences using low-level/high-level reasoning and parametric models, according to aspects of the present disclosure. A method 700 of FIG. 7 begins at block 702, in which LIDAR points corresponding to surfaces of static sequence segmentation parts are identified followed by triangulation of the LIDAR points. At block 704, the identified LIDAR points are overlaid onto the sequence segmentation parts to form an approximate 3D reconstruction of the operation sequence images. For example, as shown in FIG. 5, LIDAR points of the scene geometry (e.g., the street/road 502, the traffic signs in the fourth region of interest 540) are overlaid on the sensor data image 500 to provide a first 3D reconstruction of the operation sequence images.

At block 706, a 3D geometric spline of a street is geometrically fit on the 3D scene reconstruction over multiple frames of the operation sequence images to form a 3D reconstruction of the street. For example, as shown in FIG. 5, a 3D geometric representation of the street/road 502 is overlaid on a 3D scene reconstruction. At block 708, the 3D reconstruction of the street is removed from each of the operation sequence images. At block 710, a 3D scene reconstruction of static segmentation parts of the operation sequence images is constructed. At block 712, the 3D reconstruction of the static segmentation parts is removed from each of the operation sequence images. This iterative process removes the static segmentation parts from the operation sequence images so that traffic participants (e.g, vehicles, pedestrians, bikes, animals, etc.) or dynamic segmentation parts remain.

At block 714, the dynamic segmentation parts from each of the operation sequence images are processed over multiple frames to determine trajectories of the dynamic segmentation part. For example, estimation of the motion and trajectories of the dynamic sequence segmentation parts is performed over the frames of autonomous agent operation sequences. This estimation may be performed using, for example, global positioning system (GPS) readings and inertial measurement unit (IMU) readings recorded during operation of an autonomous agent. These GPS and IMU readings recorded during autonomous agent operation provide inter-frame constraints for recreating the autonomous agent operation sequence in a 3D simulation.

Figure 8:
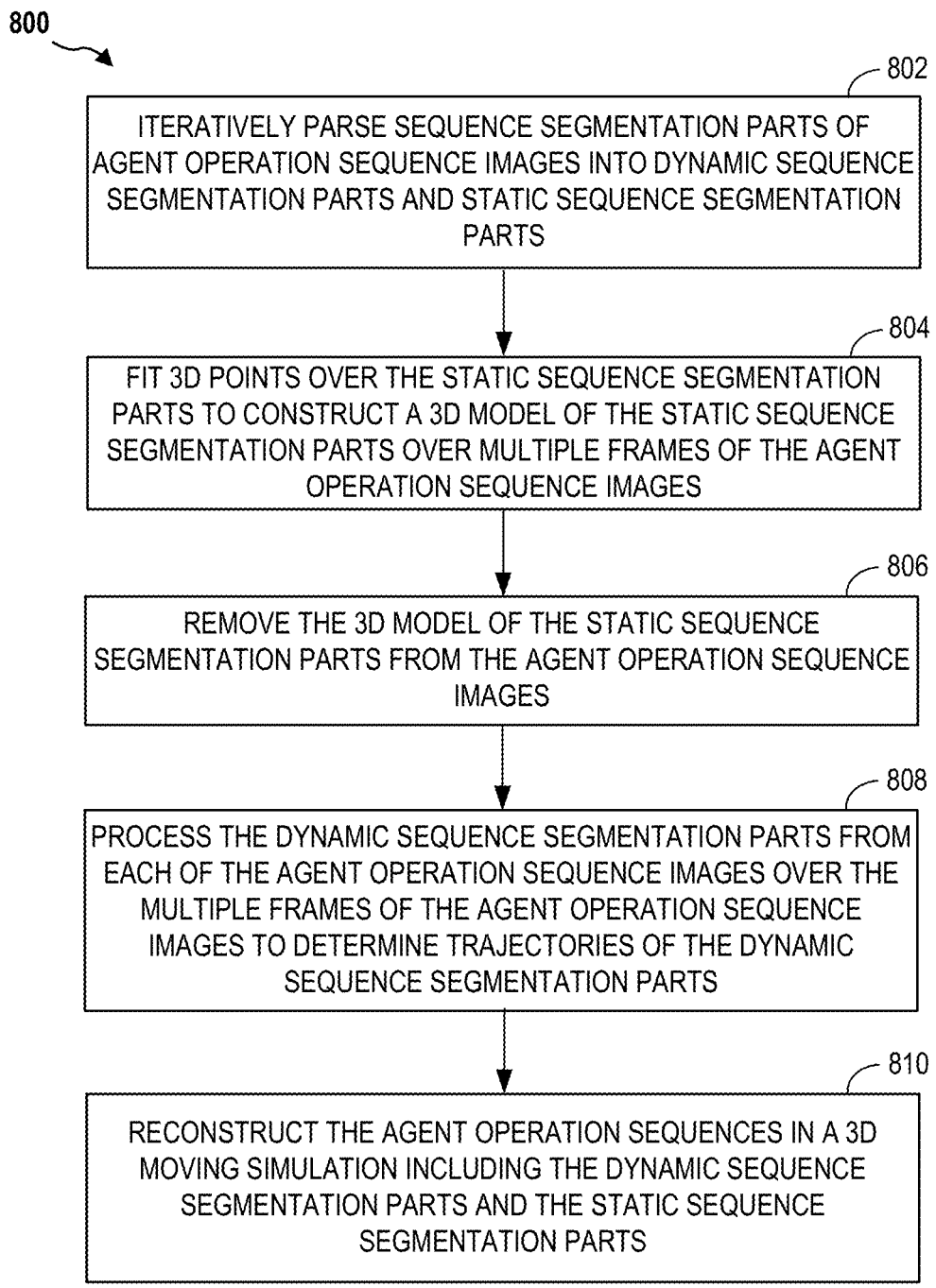
FIG. 8 is a flowchart illustrating a method for 3D scene reconstruction of agent operation sequence images, according to aspects of the present disclosure.

FIG. 8 is a flowchart illustrating a method for 3D scene reconstruction of agent operation sequence images, according to aspects of the present disclosure. A method 800 begins at block 802, in which sequence segmentation parts of agent operation sequence images are iteratively parsing into dynamic sequence segmentation parts and static sequence segmentation parts. As described herein, dynamic sequence segmentation parts may refer to traffic participants (e.g., vehicles, pedestrians, bikes, animals, etc.) As described herein, static sequence segmentation parts may refer to fixed items encountered during autonomous vehicle operations, such as road/streets, sidewalks, curbs, pedestrian areas, and scenery (e.g., trees, foliage, etc.).

At block 804, 3D points are fit over the static sequence segmentation parts to construct a 3D model of the static sequence segmentation parts over multiple frames of the agent operation sequence images. For example, as shown in FIG. 5, LIDAR points may be overlaid on the street/road 502, the sidewalk 504, and the divider 506 of the sensor data image 500. At block 806, the 3D model of the static sequence segmentation parts is removed from the agent operation sequence images. This removal may include extracting roads and sidewalks of the 3D model of the static sequence segmentation parts from the agent operation sequence images. In addition, vegetation is extracted from the 3D model of the static sequence segmentation parts from the agent operation sequence images. For example, as shown in FIG. 5, the street/road 502, the sidewalk 504, and the divider 506 may be removed from the sensor data image 500.

At block 808, the dynamic sequence segmentation parts from each of the agent operation sequence images are processed over the multiple frames of the agent operation sequence images to determine trajectories of the dynamic sequence segmentation parts. For example, as shown in FIG. 5, the traffic participants (e.g., the bicycle rider in the first region of interest 510, the vehicle in the second region of interest 520, the vehicles in the third region of interest 530, and the construction workers in the fifth region of interest 550) are processed to determine associated trajectories from motion of the traffic participants. Estimating the motion and trajectories is performed over the frames of autonomous agent operation sequences using, for example, global positioning system (GPS) readings and inertial measurement unit (IMU) readings recorded during operation of an autonomous agent. This information is also used for recreating the autonomous agent operation sequence in a 3D simulation. For example, the noted inter-frame constraints may be merged to estimate a motion sequence and trajectory of the dynamic sequence segmentation parts.

At block 810, the agent operation sequences are reconstructed in a 3D moving simulation including the dynamic sequence segmentation parts and the static sequence segmentation parts. This process is improved by inferring vehicle instances and their 3D shapes in a given scene by using a parametric model framework. In addition, refining of the inferring of the vehicle instances and their 3D shapes is improved by using a combination of low-level reasoning and high-level reasoning. Reconstruction of the agent operation sequence images in a 3D moving simulation is further described in FIG. 9.

Figure 9:
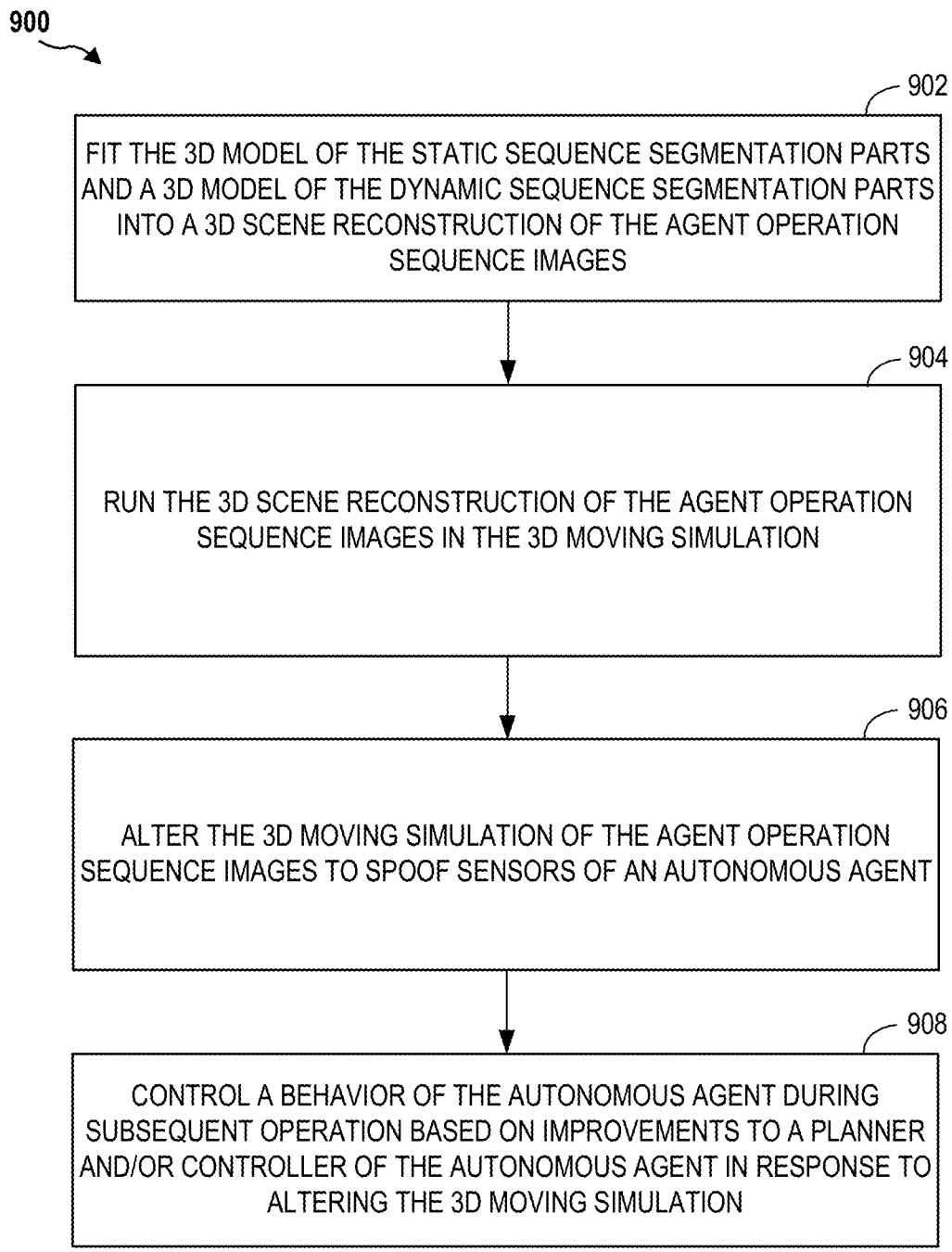
FIG. 9 illustrates a method for processing reconstruction of the agent operation sequence images in a 3D moving simulation, in accordance with aspects of the present disclosure.

FIG. 9 illustrates a method for processing reconstruction of the agent operation sequence images in a 3D moving simulation, in accordance with aspects of the present disclosure. A method 900 begins in block 902, in which a 3D model of the static sequence segmentation parts and a 3D model of the dynamic sequence segmentation parts are fit (e.g., geometrically) into a 3D scene reconstruction of the agent operation sequence images. In block 904, the 3D scene reconstruction of the agent operation sequence images is run in the 3D moving simulation. At block 906, the 3D moving simulation of the agent operation sequence images is altered to spoof sensors of an autonomous agent. For example, as shown in FIG. 5, the trajectory of the vehicle in the second region of interest 520 may be altered to test a potential collision response of the autonomous agent.

Referring again to FIG. 9, at block 908, a behavior of the autonomous agent is controlling during subsequent operation based on improvements to a planner and/or controller of the autonomous agent in response to altering the 3D moving simulation. For example, as shown in FIG. 4B, operation of the planner module 470 and/or the controller module 480 may be improved to avoid a collision in response to altering of the 3D moving simulation during subsequent operation of the autonomous agent (e.g., 140).

Aspects of the present disclosure are related to a machine learning system and method for performing 3D reconstruction and/or annotation of agent operation sequences. During operation of an autonomous vehicle, the autonomous vehicle captures various data while traveling along a route. The collected data may include, but is not limited to, recorded on-board operation sequences (e.g., transaction logs or TLOGs), sensor readings, such as cameras (e.g., red-green-blue (RGB) cameras, RGB-depth (RGB-D) cameras), light detection and ranging (LIDAR) sensors, sonar sensors, radar, global positioning system (GPS), and recorded inertial measurement unit (IMU) readings. In aspects of the present disclosure, the collected data during operation of the autonomous agent provides low-level cues that are combined with high-level cues from machine learning modes for a 3D reconstruction of a scene including scenery, actors, and a road. One aspect of the present disclosure is directed to a novel system and method for variation of a 3D simulation of an operation sequence to test and improve operation of an autonomous vehicle.

In some aspects, the method 800 may be performed by the SOC 100 (FIG. 1) or the system 200 (FIG. 2) of the autonomous vehicle 140. That is, each of the elements of method 800 may, for example, but without limitation, be performed by the SOC 100 or the system 200 or one or more processors (e.g., CPU 102 and one of the local processing units 202) and/or other components included therein of the autonomous vehicle 140.

The model includes . . . means TO BE COMPLETED AFTER CLAIM LANGUAGE IS APPROVED. In one aspect, the . . . means, . . . means, and/or . . . means may be the CPU 102, program memory associated with the CPU 102, the dedicated memory block 118, local processing units 202, and the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for a 3D scene reconstruction of autonomous agent operation sequences, comprising:
    iteratively parsing sequence segmentation parts of agent operation sequence images into dynamic sequence segmentation parts and static sequence segmentation parts;
    fitting 3D points over the static sequence segmentation parts to construct a 3D model of the static sequence segmentation parts over multiple frames of the agent operation sequence images;
    removing the 3D model of the static sequence segmentation parts from the agent operation sequence images;
    processing the dynamic sequence segmentation parts from each of the agent operation sequence images over the multiple frames of the agent operation sequence images to determine trajectories of the dynamic sequence segmentation parts;
    reconstructing the agent operation sequences in a 3D moving simulation including the dynamic sequence segmentation parts and the static sequence segmentation parts;
    altering the 3D moving simulation of the autonomous agent operation sequence images to spoof sensors of an autonomous agent to test a potential collision response of the autonomous agent; and
    controlling a collision avoidance behavior of a vehicle based on improvements to a planner and/or controller of the autonomous agent in response to altering the 3D moving simulation.

2. The method of claim 1, in which reconstructing comprises:
    fitting the 3D model of the static sequence segmentation parts and a 3D model of the dynamic sequence segmentation parts into a 3D scene reconstruction of the agent operation sequence images; and
    running the 3D scene reconstruction of the agent operation sequence images in the 3D moving simulation.

3. The method of claim 1, in which fitting 3D points comprises geometrically fitting a 3D geometric spline of a street on the 3D model of the static sequence segmentation parts to construct a 3D representation of the street over the multiple frames of the agent operation sequence images.

4. The method of claim 3, in which removing further comprises:
    removing the 3D representation of the street from the agent operation sequence images;
    constructing a 3D scene reconstruction of remaining static sequence segmentation parts of the agent operation sequence images; and
    removing the 3D scene reconstruction of the remaining static sequence segmentation parts from the agent operation sequence images to isolate the dynamic sequence segmentation parts.

5. The method of claim 1, in which iterative parsing comprises:
    decomposing the agent operation sequence images into the static sequence segmentation parts and the dynamic sequence segmentation parts using a trained deep neural network.

6. The method of claim 1, in which iterative parsing comprises:
    inferring vehicle instances and their 3D shapes in a given scene by using a parametric model framework; and
    refining the inferring of the vehicle instances and their 3D shapes using a combination of low-level reasoning and high-level reasoning.

7. The method of claim 1, in which fitting comprises:
    identifying LIDAR points that correspond to surfaces of the static sequence segmentation parts;
    triangulating the LIDAR points; and
    overlaying the LIDAR points onto the static sequence segmentation parts over the multiple frames of the agent operation sequence images to form the 3D model of the static sequence segmentation parts.

8. The method of claim 1, in which removing the 3D model of the static sequence segmentation parts, comprises:
    extracting roads and sidewalks of the 3D model of the static sequence segmentation parts from the agent operation sequence images; and
    extracting vegetation of the 3D model of the static sequence segmentation parts from the agent operation sequence images.

9. The method of claim 1, further comprising training a neural network to identify instances and segmentations of traffic participants and scene geometry using object detection methods, in which parametric shape models and geometric fitting are conducted over multiple sensor modalities to confirm observations and measure error with projection metrics regarding the instances and segmentations of the traffic participants and scene geometry.

10. The method of claim 1, in which processing the dynamic sequence segmentation parts comprises merging inter-frame constraints to estimate a motion sequence and trajectory of the dynamic sequence segmentation parts.

11. A non-transitory computer-readable medium having program code recorded thereon for a 3D scene reconstruction of autonomous agent operation sequences, the program code being executed by a processor and comprising:
    program code to iteratively parse sequence segmentation parts of agent operation sequence images into dynamic sequence segmentation parts and static sequence segmentation parts;
    program code to fit 3D points over the static sequence segmentation parts to construct a 3D model of the static sequence segmentation parts over multiple frames of the agent operation sequence images;
    program code to remove the 3D model of the static sequence segmentation parts from the agent operation sequence images;
    program code to process the dynamic sequence segmentation parts from each of the agent operation sequence images over the multiple frames of the agent operation sequence images to determine trajectories of the dynamic sequence segmentation parts;
    program code to reconstruct the agent operation sequences in a 3D moving simulation including the dynamic sequence segmentation parts and the static sequence segmentation parts;
    program code to alter the 3D moving simulation of the autonomous agent operation sequence images to spoof sensors of an autonomous agent to test a potential collision response of the autonomous agent; and program code to control a collision avoidance behavior of a vehicle based on improvements to a planner and/or controller of the autonomous agent in response to altering the 3D moving simulation.

12. The non-transitory computer-readable medium of claim 11, in which program code to fit 3D points comprises program code to geometrically fit a 3D geometric spline of a street on the 3D model of the static sequence segmentation parts to construct a 3D representation of the street over the multiple frames of the agent operation sequence images.

13. The non-transitory computer-readable medium of claim 12, in which the program code to remove further comprises:
   program code to remove the 3D representation of the street from the agent operation sequence images;
   program code to construct a 3D scene reconstruction of remaining static sequence segmentation parts of the agent operation sequence images; and
   program code to remove the 3D scene reconstruction of remaining static sequence segmentation parts from the agent operation sequence images to isolate the dynamic sequence segmentation parts.

14. The non-transitory computer-readable medium of claim 11, in which the program code to iteratively parse comprises:
   program code to infer vehicle instances and their 3D shapes in a given scene by using a parametric model framework; and
   program code to refine the inferring of the vehicle instances and their 3D shapes using a combination of low-level reasoning and high-level reasoning.

15. The non-transitory computer-readable medium of claim 11, in which the program code to fit comprises:
   program code to identify LIDAR points that correspond to surfaces of the static sequence segmentation parts;
   program code to triangulate the LIDAR points; and
   program code to overlay the LIDAR points onto the static sequence segmentation parts over the multiple frames of the agent operation sequence images to form the 3D model of the static sequence segmentation parts.

16. The non-transitory computer-readable medium of claim 11, in which the program code to remove the 3D model of the static sequence segmentation parts, comprises:
   program code to extract roads and sidewalks of the 3D model of the static sequence segmentation parts from the agent operation sequence images; and
   program code to extract vegetation of the 3D model of the static sequence segmentation parts from the agent operation sequence images.

17. An autonomous vehicle system for a 3D scene reconstruction of autonomous agent operation sequences, comprising:
   a neural network configured to fit a 3D model of static sequence segmentation parts and a 3D model of dynamic sequence segmentation parts over multiple frames of the agent operation sequences to construct a 3D scene reconstruction of the agent operation sequence images, to remove the 3D model of the static sequence segmentation parts from the agent operation sequence images, to process the dynamic sequence segmentation parts from each of the agent operation sequence images over the multiple frames of the agent operation sequence images to determine trajectories of the dynamic sequence segmentation parts, to run the 3D scene reconstruction in a 3D moving simulation of the agent operation sequence images, including the determined trajectories of the dynamic sequence segmentation parts and the static segmentation parts, and to alter the 3D moving simulation of agent operation sequence images to spoof sensors of an autonomous agent to test a potential collision response of the autonomous agent; and
   a controller configured to control a collision avoidance behavior of a vehicle based on improvements to a planner and/or a controller of the autonomous agent in response to altering the 3D moving simulation.

18. The autonomous vehicle system of claim 17, in which the neural network is trained to identify instances and segmentations of traffic participants and scene geometry in the agent operation sequence images using object detection methods, in which parametric shape models and geometric fitting are conducted over multiple sensor modalities to confirm observations and measure error with projection metrics regarding the instances and segmentations of the traffic participants and scene geometry.

* * * * *